US006952296B1

United States Patent
Dultz et al.

(10) Patent No.: US 6,952,296 B1
(45) Date of Patent: Oct. 4, 2005

(54) METHOD AND DEVICE FOR FORMING THE INTENSITY PROFILE OF A LASER BEAM

(75) Inventors: Wolfgang Dultz, Frankfurt am Main (DE); Leonid Beresnev, Columbia, MD (US); Rosemarie Hild, Apolda (DE); Bernhard Hils, Königstein/Taunus (DE)

(73) Assignee: Deutsche Telekom AG, Bonn (DE)

( * ) Notice: Subject to any disclaimer, the term of this patent is extended or adjusted under 35 U.S.C. 154(b) by 442 days.

(21) Appl. No.: 09/786,837

(22) PCT Filed: Jun. 10, 2000

(86) PCT No.: PCT/EP00/05367

§ 371 (c)(1),
(2), (4) Date: Aug. 6, 2001

(87) PCT Pub. No.: WO01/04685

PCT Pub. Date: Jan. 18, 2001

(30) Foreign Application Priority Data

Jul. 9, 1999 (DE) .......................... 199 31 989

(51) Int. Cl.$^7$ ............................ G02B 26/00; G02F 1/00
(52) U.S. Cl. ........................ 359/237; 359/247; 359/267
(58) Field of Search ................. 359/237, 240, 359/245–47, 250, 263, 267, 272, 290–2, 302, 297–8, 315, 318–9, 322–3, 266, 247–248; 382/310–11, 210–211

(56) References Cited

U.S. PATENT DOCUMENTS

| 4,632,518 A | * | 12/1986 | Jensen ..................... 359/239 |
| 4,926,177 A | * | 5/1990 | Sakata ..................... 341/137 |
| 4,953,937 A | | 9/1990 | Kikuchi et al. .......... 350/96.18 |
| 5,056,897 A | * | 10/1991 | Akiyama et al. ............ 349/17 |
| 5,528,702 A | * | 6/1996 | Mitsuoka et al. ........... 382/211 |
| 5,610,733 A | | 3/1997 | Feldman et al. ............. 359/9 |
| 5,886,969 A | * | 3/1999 | Maeda et al. ............. 369/100 |
| 5,986,807 A | | 11/1999 | Fork ........................ 359/569 |

FOREIGN PATENT DOCUMENTS

EP  0 394 674  10/1990

OTHER PUBLICATIONS

M.P. Petrov et al.; "Photorefractive Crystals in Coherent Optical Systems;" Springer–Verlag, ISBN3–540–52603–X, 1991, Germany.
I. Gur et al.; "Diffraction limited domain flat–top generator," Optics Communications 145 (1998), pp. 237–248.

* cited by examiner

*Primary Examiner*—Georgia Epps
*Assistant Examiner*—Jessica Stultz
(74) *Attorney, Agent, or Firm*—Kenyon & Kenyon

(57) ABSTRACT

The present invention relates to a method and a device for forming the intensity profile of a laser beam, in particular for producing a homogeneous intensity profile. In an embodiment of the present invention, the laser beam can strike an optically addressable spatial light-modular (OASLM), whose local transmission or reflection properties depend in nonlinear fashion on the local illumination intensity.

1 Claim, 4 Drawing Sheets

METHOD AND DEVICE FOR FORMING THE INTENSITY PROFILE OF A LASER BEAM

FIELD OF THE INVENTION

The present invention relates to a method and a device for forming the intensity profile of a laser beam, in particular for producing a homogeneous intensity profile, as well as to the use of an optically addressable spatial light modulator (OASLM) for forming the intensity profile of a laser beam.

BACKGROUND OF THE INVENTION

The physical properties of laser light differ fundamentally from those of conventional light sources. Laser light is coherent and can be produced as a light beam having a small, even if finite aperture angle. This narrow beam concentration is particularly advantageous for illumination and imaging purposes, since the wave fronts of the laser light approach the ideal of plane waves. They can be transformed into spherical wave fronts and can be utilized for highly resolving, diffraction-limiting focusing.

One drawback of the laser beam is its Gaussian character, which is determined by the manner in which light is generated in the resonator. The intensity distribution of the light transversely to the beam has the shape of a Gaussian bell curve. This means that the intensity is at a maximum in the middle of the beam, and it then drops off exponentially toward the edges.

This is a drawback in image processing and projection technologies which require illuminating flat photomasks. However, it is also a drawback in interferometry, where one desires a most uniform possible illumination of the lighted surface. Such uniformity is not provided when working with a Gaussian intensity profile. In material processing as well, such as in medical applications involving heating of tissue, or in laser welding, uniform heating is required over the entire width of the laser beam or of the illuminated surface. Such uniform heating cannot be attained when working with a Gaussian shaped illumination and, thus, for instance, a Gaussian energy deposition. For that reason, the cross-sectional profile of the light beam should be as rectangular as possible for the areas of application mentioned. The spatial intensity profile should be homogeneous, i.e., more or less constant over a certain width. To effect this, in practice, the beam is widened and one then works only with the more or less homogeneous inner beam region with the outer region being masked out. However, this can lead to significant intensity losses.

Since the actual laser system, the optical amplification medium in the resonator, is not readily accessible to the user, the forming of the beam into a rectangular profile must take place outside of the laser. For this purpose, optical filters, so-called "bull's eye" filters are known, which attenuate the laser beam more vigorously in the middle than at the edges, thereby flattening the bell shape of the beam profile to a virtually rectangular profile. For the most part, these filters are made of a transparent plate, e.g., a glass plate, upon which a more or less reflective coating, for example a metal, is coated by vapor deposition. The desired beam profile is produced by properly selecting the locally dependent optical density, i.e., the local transmission and reflection properties. These filters are static and, therefore, can only be used for a specific laser having a fixed, known intensity profile. When the laser changes its profile, e.g., due to fluctuations or manifestations of aging, the filters undesirably alter the shape of the profile, since they are no longer adapted to the laser data. Another disadvantage associated with reflecting filters of this kind is that unevenly reflected laser light has a reactive effect on the laser and can degrade its stability. Moreover, in place of reflecting filters, it is also generally known to use holographic filters for forming beams. See, for example, I. Gur et al.: Diffraction limited domain flat-top generator; Opt. Communications 145, 237 (1998), incorporated herein by reference. These filters are also static and are not responsive to time-related changes in the laser beam profile. Also problematic is the fact that the rectangular profile is only produced in the imaging plane of the holographic element.

SUMMARY OF THE INVENTION

The present invention provides a device and method for forming the most homogeneous possible, rectangular beam profile from any initial intensity profile. The present invention further provides a device and method for forming the most homogeneous possible, rectangular beam profile for a Gaussian beam profile, so that, among other things, the formed beam profile can be substantially stable with respect to fluctuations in the incident intensity profile and in the light intensity. The present invention further provides a method for forming the intensity profile of a laser beam, in particular for producing a homogeneous intensity profile, the laser beam striking an optically addressable spatial light modular (OASLM), whose local transmission or reflection properties depend in nonlinear fashion on the local illumination intensity.

An embodiment of the present invention provides a device for forming the intensity profile of a laser beam, in particular for producing a homogeneous intensity profile, is composed of an optically addressable spatial light modular (OASLM), whose local transmission or reflection properties depend in nonlinear fashion on the local illumination intensity, as well as of at least one telescope imaging system, which is capable of spatially widening the laser beam.

Some embodiments of the present invention further provide using an optically addressable spatial light modular (OASLM) for forming the intensity profile of a laser beam, in particular for producing a homogeneous intensity profile.

Some embodiments of the present invention further provide a beam former, i.e., a method for forming beams, where the formed intensity profile is stabilized with respect to changes in the original intensity profile through the use of an active or adaptive optical element having optical properties that are dependent upon the local illumination intensity. An optical element can be used whose local transparency changes with the local illumination intensity. A defined beam profile, which is virtually independent of fluctuations in the initial intensity distribution, is automatically produced. This can also be done without any additional controlling external influence. For that reason, the method and the beam former, respectively, can be used for any laser systems at all, and only need to be adapted to a minor degree to prevailing conditions.

An embodiment of the present invention further provides that the optically non-linear element is an optically addressable spatial light modulator (OASLM) or a liquid crystal light valve. The optically non-linear element can be driven in the saturation range to produce a homogeneous (rectangular) laser beam profile; the locally transmitted intensity can then independent of the local illumination intensity.

Optically addressable spatial light modulators (OASLM) are known, for example, from "Spatial Light Modulators;

OSA—Technical Digest ISBN 155752-494-7 Washington 1997, hereby incorporated by reference herein, which are made of a photoconductive layer and of an electro-optical, voltage-sensitive layer. In response to local irradiation, the voltage in the photoconductor breaks down locally and is transferred to the electro-optical layer. On a localized basis, this alters the transmission or reflection characteristics of the electro-optical layer, which, in turn, is now optically indicative of the irradiation. The photoconductive layer must be sensitive to the wavelength of the incident light. The electro-optical layer is, for example, a liquid crystal, which has optical modulator properties within broad spectral ranges. Certain materials unite the properties of the photo-sensitive and voltage-sensitive layer, such as photorefractive crystals or polymers (Spatial Light Modulators; OSA—Technical Digest ISBN 155752-494-7 Washington 1997, M. Petrov et al.: Photorefractive Crystals, Berlin 1991).

The present invention provides liquid crystals which can have nonlinear optical properties and can be used in OASLMs. In the present invention, the OASLM can be based, for example, on nematic or helical smectic liquid crystals, the latter having an operating frequency of $10^2$ to $10^3$ Hz, thereby facilitating faster reactions to output profile changes than do elements based on nematic liquid crystals (switching times in the range of $10^{-2}$ s). The modulation properties of these liquid crystals depend nonlinearly on the applied voltage and, thus, on the local illumination intensity 1 on the photoconductor.

In the present invention, a transmission characteristic of an OALSM of this kind may be exemplified by a linear relation between the illumination intensity and transmitted intensity for low illumination intensities, as well as by a transition into the saturation range, where the transmitted intensity is virtually independent of the illumination intensity. For higher intensities, the transmitted intensity can again depend more heavily on the illumination intensity.

The properties of the OASLM in the present invention can thus enable high light intensities to be attenuated more vigorously than low intensities. In this manner, the intensity of a Gaussian beam in the center can be suppressed as compared to the edge regions, and the transmitted intensity approaches a rectangular shape having a flat plateau in the center. Another embodiment of the present invention provides that the OASLM layers undergo pattern delineation. A further embodiment provides that the OASLM layers are resolved into individual zones, in particular optical points (pixels), and in a possible embodiment of the present invention, can be capable of being driven individually This diminishes crosstalk between nearby picture elements. This permits electrical intervention in the modulator, on a pixel-by-pixel basis, in particular an adaptation of the local transmission properties, targeted to the initial intensity profile. One can regulate the driving of the individual zones by measuring the shaped beam profile and examining it for deviations from a nominal form, in particular from the rectangular form. By way of a feedback path, the magnitude of the local deviations is then used as a basis for adapting the transmission properties of the zones or of the picture elements of the OASLM.

In some embodiments of the present invention, to work in the saturation region of the OASLM, the intensity of the laser beam to be shaped can be preferably adapted by widening the beam and/or through the use of optical filters at the saturation region of the OASLM. For purposes of beam widening, an optical imaging system can be preferably inserted into the optical path of rays, within which the OASLM is located. The optical imaging system can encompass two telescope imaging systems, preferably designed as mechanically or electrically adjustable or controllable zoom systems. Thus, the beam widening can be variable, so that changes in intensity can always be compensated by intensity fluctuations of the laser or by replacing the laser.

DETAILED DESCRIPTION

Figure 1:
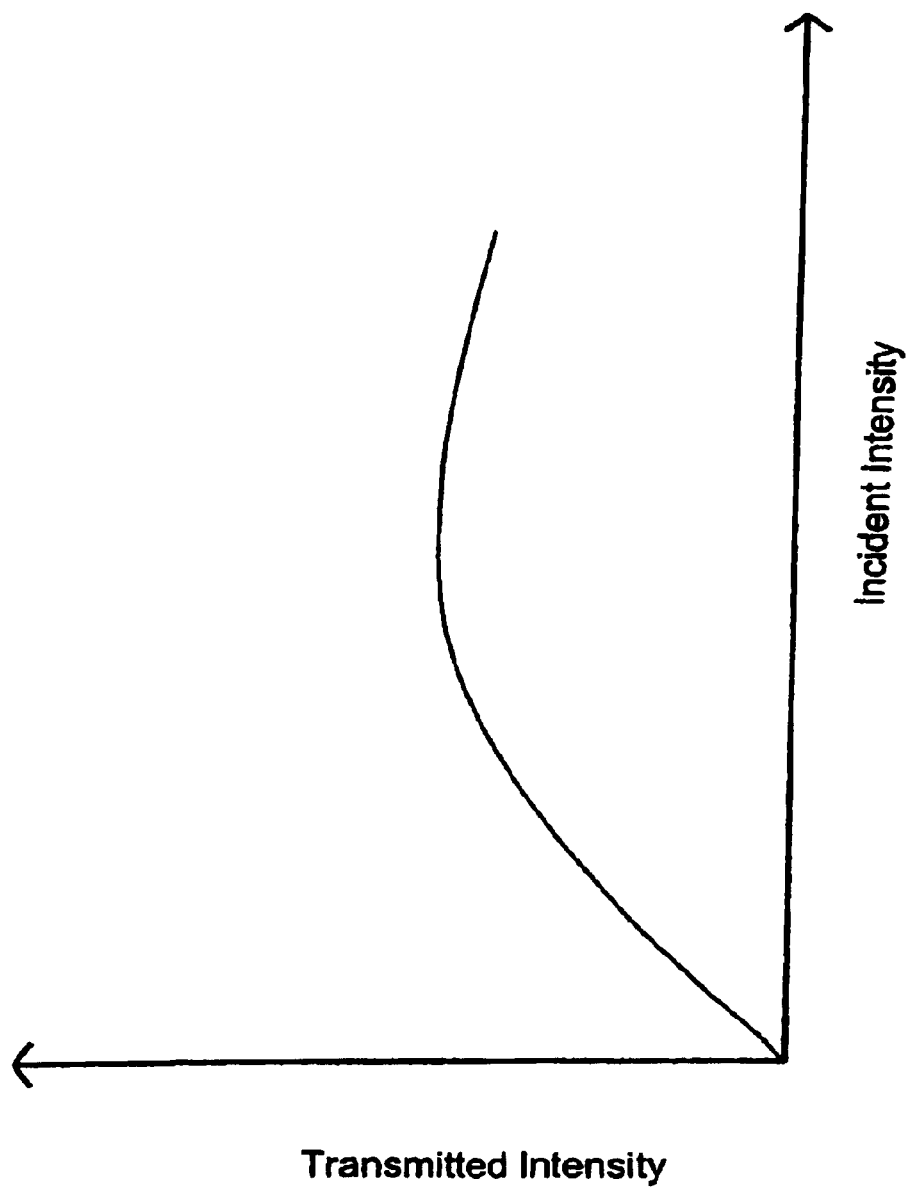
FIG. 1 shows a typical transmission characteristic of an OASLM in accordance with the present invention.

FIG. 1 schematically depicts a typical transmission characteristic of an OASLM, as used in accordance with the present invention, the incident intensity being plotted on the x-axis and the transmitted intensity on the y-axis. For low intensities, the OASLM has a substantially linear transmission characteristic, for example, it is essentially transparent to the incident radiation. For higher incident intensities, the transmitted intensity is substantially independent of the incident intensity; this saturation range is selected as the working range for the beam formation. The intensity of the incident laser beam to be formed can be adapted to this working range by filters or by widening the beam. In S this context, by widening the beam, once it has passed through the OASLM, the light is able to be focused again and there is minimal loss of total intensity.

Figure 2A:
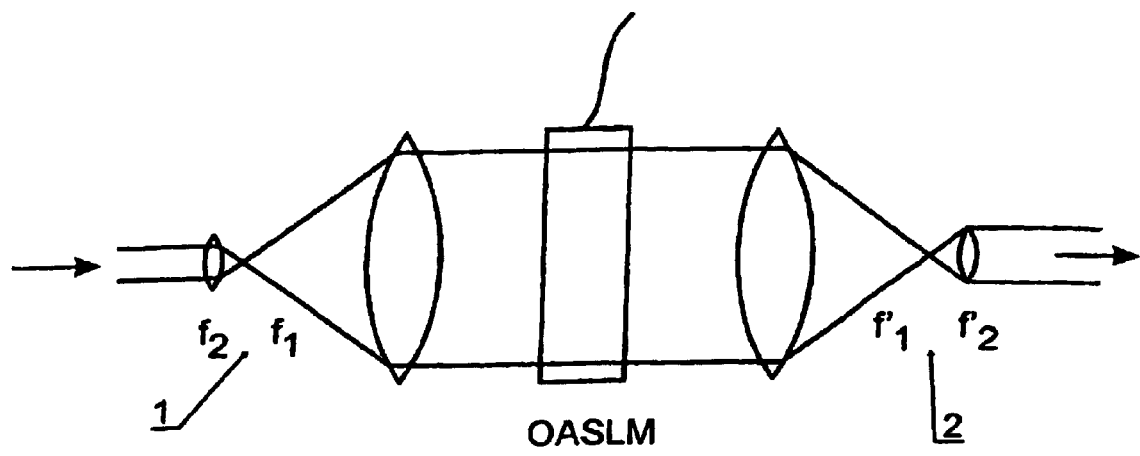
FIG. 2a shows an embodiment of the present invention for forming a beam with the use of an OASLM.
Figure 2B:
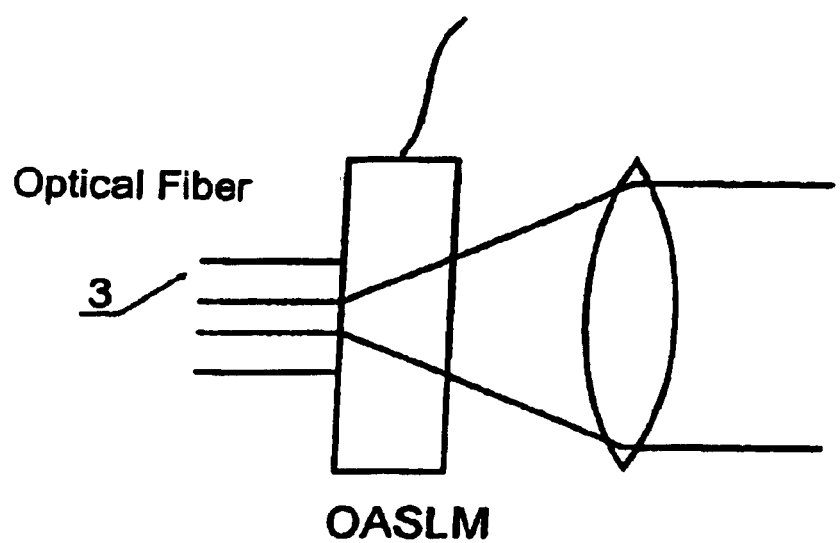
FIG. 2b shows another embodiment of the present invention for forming a beam with the use of an OASLM.
Figure 2C:
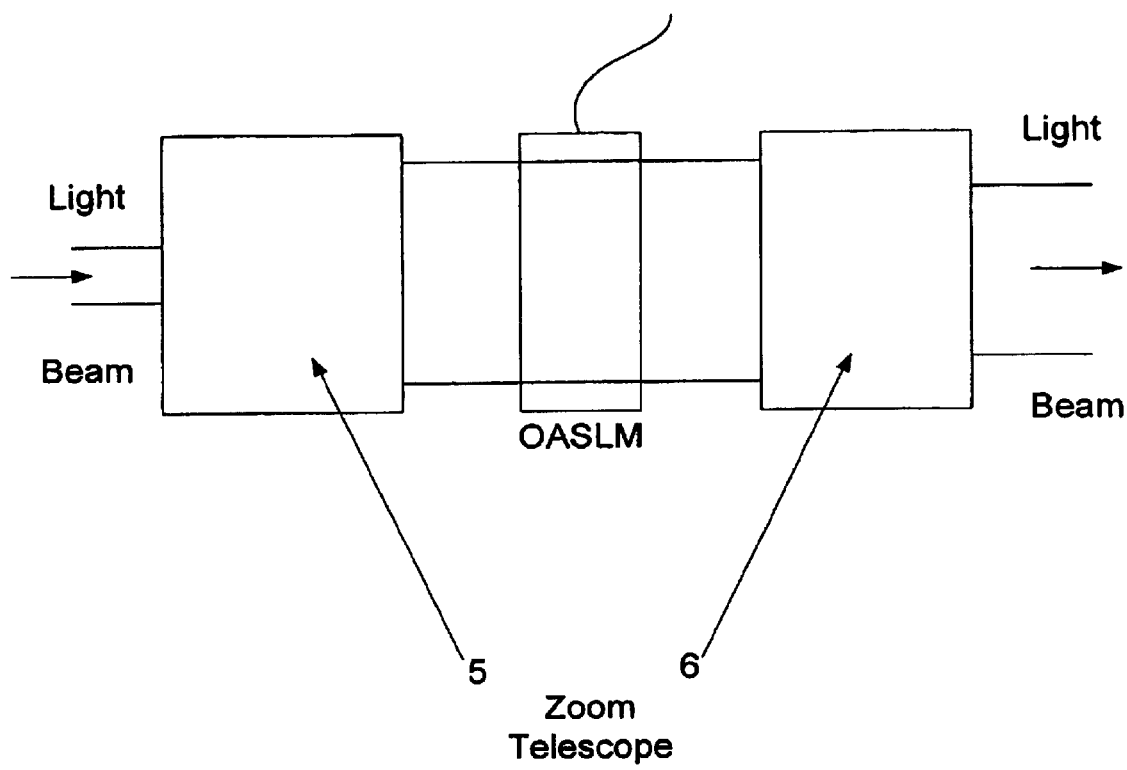
FIG. 2c shows another embodiment of the present invention for forming a beam, with the use of an OASLM.

Three set-ups are shown in FIGS. 2a–c for forming a beam in accordance with the present invention, using an OASLM. FIG. 2a illustrates a set-up where the OASLM is inserted between two coupler telescopes 1, 2, into the laser's path of rays. Telescopes 1, 2 each include two lenses having focal lengths $f_1$, $f_2$ and $f_1'$, $f_2'$, respectively, arranged at a distance of $f_1+f_2$ and $f_1'+f_2'$, respectively. The telescopes can be used for beam widening, to reduce the intensity in the laser beam center to the point where it coincides with the plateau region of the characteristic in accordance with FIG. 1. The laser beam having the flattened beam profile exits the second telescope 2 to the right. If it is necessary to simultaneously widen the beam, the right telescope 2 must have a smaller magnification than the left telescope 1.

In certain cases, for example, once a laser is coupled into an optical fiber, the laser intensity can already be optimally adapted to the OASLM. Without any previous widening, the light can then be directly conducted to the OASLM, as shown in FIG. 2b. The light from fiber 3 then falls directly on beam former OASLM, which can be in optical contact with fiber 3. Reflection losses experienced during the transition into the OASLM, are able to be kept to a minimum in this case by using an oil to adapt the refraction index. Thus the OASLM can have an especially small type of construction in this embodiment of the present invention.

When heavy fluctuations in laser intensity is being experienced, or when the intention is to use the same beam former for different types of lasers, it is recommended to connect two zoom telescopes 5, 6 instead of telescopes having fixed magnifications, as in FIG. 2a. A possible embodiment of this is shown schematically in FIG. 2c. In this case, the beam widening can be altered and, given electrically adjustable zoom telescopes, also controlled.

The present invention has many diverse industrial applications. The present invention can be employed in applications where the most uniform possible illumination of surfaces by laser light is critical, especially when working with image processing and projection technology, in interferometry, as well as in material processing where the use of lasers is required.

What is claimed is:

1. A method for forming the intensity profile of a laser beam, comprising:

providing the laser beam so that the laser beam strikes an optically addressable spatial light modulator, the optically addressable spatial light modulator having at least one of a local transmission property and a reflection property depending nonlinearly on a local illumination intensity;

inserting an optical imaging system into an optical path of rays for beam widening, the optically addressable spatial light modulator being located in the optical path of rays;

wherein the at least one of the local transmission property and the reflection property of the optically addressable spatial light modulator has a saturation range, and wherein at least one of a locally transmitted intensity and a reflected intensity of the laser beam in the saturation range is substantially independent of a locally incident intensity of the laser beam outside the saturation range;

wherein the intensity of the laser beam to be formed is adapted to the saturation range of the optically addressable spatial light modulator by at least one of a widening of the laser beam and an optical filter;

wherein the optical imaging system includes a first telescope imaging system and a second telescope imaging system designed as an at least one of a mechanically adjustable zoom system, an electrically adjustable zoom system, a mechanically controllable zoom system, and an electrically controllable zoom system, the widening of the laser beam being an at least one of variable and adaptable to an intensity change.

* * * * *